(12) United States Patent
Oikawa et al.

(10) Patent No.: US 10,625,352 B2
(45) Date of Patent: Apr. 21, 2020

(54) CUTTING INSERT AND INDEXABLE ROTATING TOOL

(71) Applicant: TUNGALOY CORPORATION, Fukushima (JP)

(72) Inventors: Yuki Oikawa, Iwaki (JP); Yuma Kondou, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 0 days.

(21) Appl. No.: 16/132,589

(22) Filed: Sep. 17, 2018

(65) Prior Publication Data

US 2019/0118275 A1  Apr. 25, 2019

(30) Foreign Application Priority Data

Oct. 25, 2017 (JP) .................. 2017-205726

(51) Int. Cl.
   *B23C 5/20* (2006.01)
   *B23C 5/22* (2006.01)
   *B23C 5/10* (2006.01)

(52) U.S. Cl.
   CPC .............. *B23C 5/207* (2013.01); *B23C 5/109* (2013.01); *B23C 5/2217* (2013.01); *B23C 2200/0438* (2013.01); *B23C 2200/126* (2013.01); *B23C 2200/203* (2013.01); *B23C 2210/168* (2013.01)

(58) Field of Classification Search
   CPC ........ B23C 2200/126; B23C 2210/168; B23C 2200/0438; B23C 2200/203; B23C 5/109; B23C 5/207; B23C 2200/0461; B23C 2200/201; B23C 2200/366; B23C 5/06
   See application file for complete search history.

(56) References Cited

U.S. PATENT DOCUMENTS

| | | | |
|---|---|---|---|
| 5,388,932 A * | 2/1995 | DeRoche | B23C 5/207 407/113 |
| 5,460,464 A * | 10/1995 | Arai | B23C 5/109 407/114 |
| 5,486,073 A * | 1/1996 | Satran | B23C 5/109 407/113 |
| 5,593,255 A * | 1/1997 | Satran | B23C 5/109 407/113 |
| 5,775,855 A | 7/1998 | Reiterman et al. | |
| 5,893,683 A * | 4/1999 | Johnson | B23C 5/109 407/113 |
| 7,677,845 B2 * | 3/2010 | Limell | B23B 27/1622 407/48 |
| 7,972,091 B2 * | 7/2011 | Svenningsson | B23C 5/10 407/113 |

(Continued)

FOREIGN PATENT DOCUMENTS

| | | |
|---|---|---|
| EP | 0585800 A1 | 3/1994 |
| JP | H09-019820 A1 | 1/1997 |

(Continued)

*Primary Examiner* — Sara Addisu
(74) *Attorney, Agent, or Firm* — Studebaker & Brackett PC

(57) ABSTRACT

A cutting insert mounted on a rotating tool including a body that rotates about a predetermined rotational axis. The cutting insert includes an upper surface, a lower surface and a peripheral side surface. The cutting insert further includes an inner cutting edge and a corner cutting edge. A top part, which has the maximum distance from the lower surface, is located on the corner cutting edge.

9 Claims, 5 Drawing Sheets

(56) References Cited

U.S. PATENT DOCUMENTS

| | | | |
|---|---|---|---|
| 2004/0071515 A1* | 4/2004 | Arvidsson | B23C 5/109 407/113 |
| 2004/0253062 A1* | 12/2004 | Schleinkofer | B23C 5/109 407/48 |
| 2006/0013661 A1* | 1/2006 | Long, II | B23B 27/1622 407/113 |
| 2006/0275088 A1* | 12/2006 | Lehto | B23C 5/1045 407/40 |
| 2009/0311057 A1 | 12/2009 | Yoshida et al. | |
| 2010/0003090 A1* | 1/2010 | Johansson | B23C 5/202 407/113 |
| 2011/0076106 A1* | 3/2011 | Morrison | B23C 5/1045 407/102 |
| 2012/0009029 A1* | 1/2012 | Saji | B23C 5/109 407/67 |
| 2013/0071194 A1 | 3/2013 | Hecht | |
| 2015/0139743 A1 | 5/2015 | Ballas | |
| 2017/0008099 A1* | 1/2017 | Touma | B23C 5/109 |
| 2017/0297120 A1* | 10/2017 | Fang | B23C 5/2247 |
| 2018/0036811 A1* | 2/2018 | Saji | B23C 5/109 |
| 2018/0339350 A1* | 11/2018 | Mura | B23C 5/109 |
| 2019/0283151 A1* | 9/2019 | Jansson | B23C 5/2221 |

FOREIGN PATENT DOCUMENTS

| | | | |
|---|---|---|---|
| JP | H09-108989 A | | 4/1997 |
| JP | 2000042821 A | * | 2/2000 |
| JP | 2002-210609 A | | 7/2002 |
| JP | 2009-119572 A | | 6/2009 |
| JP | 2014-526394 A | | 10/2014 |
| WO | 2006/041353 A1 | | 4/2006 |
| WO | 2009/034633 A | | 3/2009 |
| WO | 2014/196573 A1 | | 12/2014 |

* cited by examiner

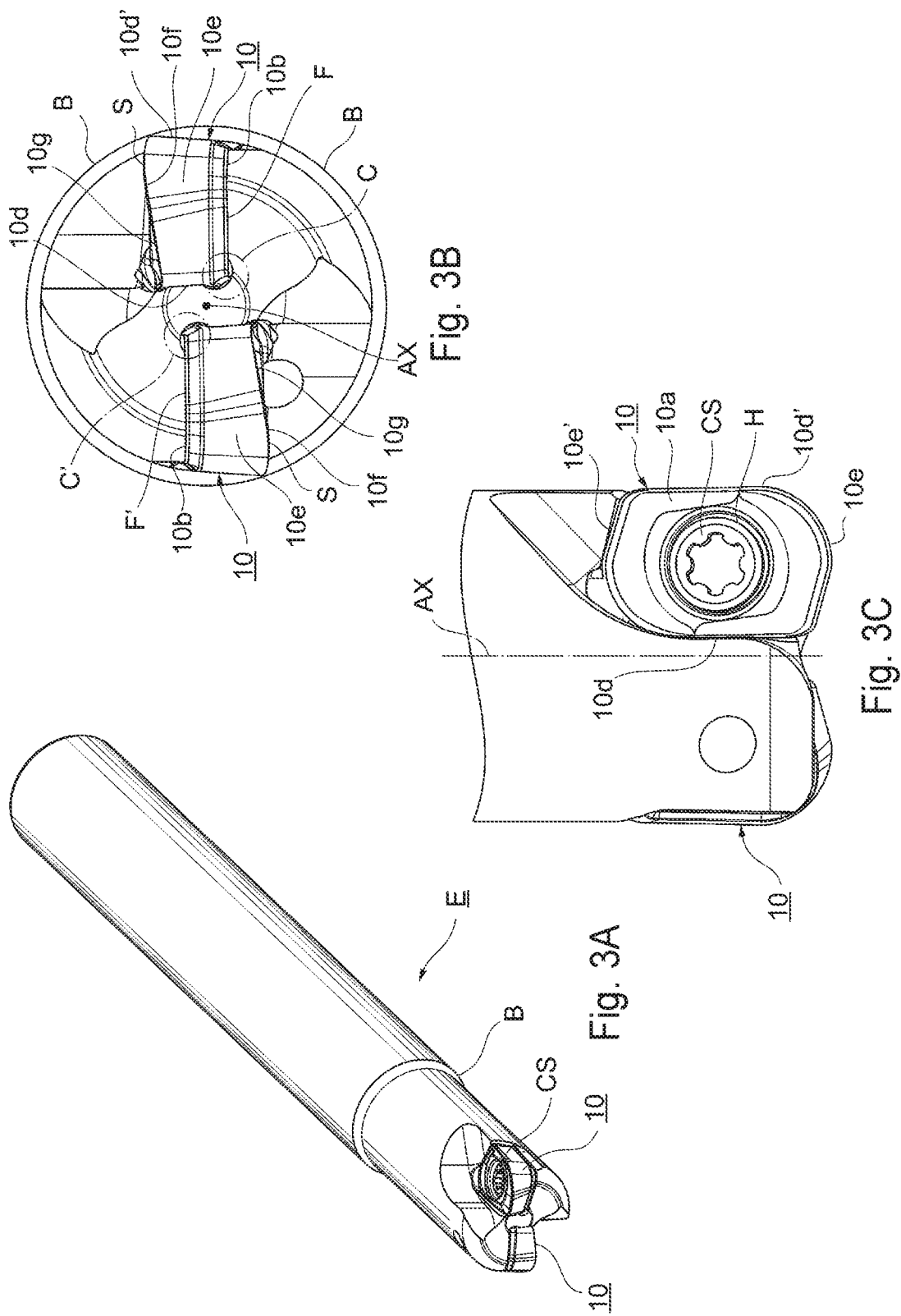

CUTTING INSERT AND INDEXABLE ROTATING TOOL

TECHNICAL FIELD

The present invention relates to a cutting insert and an indexable rotating tool.

BACKGROUND ART

During the machining of a mold, etc., a thin end mill with a tool diameter of approximately from 8 mm to 20 mm has conventionally been used. In order to round a corner of a casting, a curved surface (referred to as a "corner R" or the like) needs to be formed between a bottom surface of the mold and a wall surface thereof.

Patent Document 1 discloses an insert 1 which comprises corner parts 11 each having a high curvature radius in order for such corner R to be formed.

CITATION LIST

Patent Documents

Patent Document 1: JP2009-119572 A

SUMMARY

Technical Problem

However, a conventional cutting insert has low efficiency in discharging the chips produced and has therefore involved the jamming of chips during cutting.

In view of the above, an object of the present invention is to provide a cutting insert and an indexable rotating tool which achieve an improvement of chip discharging efficiency.

Solution to Problem

A cutting insert according to an aspect of the present disclosure is mounted on an indexable rotating tool comprising a body that rotates about a predetermined rotational axis. Further, the above cutting insert comprises: an upper surface; a lower surface to be mounted on a seating surface of the body; and a peripheral side surface which connects the upper surface and the lower surface and regarding which a cutting edge is formed with respect to the upper surface.

The cutting edge comprises: an inner cutting edge; and a corner cutting edge which is connected to the inner cutting edge and which, in a plan view seen from a direction facing the upper surface, has a predetermined curvature, has a width corresponding to from 40% or more to 50% or less of a width of the cutting insert in a direction perpendicular to the rotational axis, and is formed at a position that is further from the rotational axis than the inner cutting edge, and, as to a distance between the lower surface and the cutting edge, a top part, which has a maximum distance from the lower surface, is located on the corner cutting edge, and in the plan view seen from the direction facing the upper surface, the top part is formed in a region covering 20% or less of the width of the cutting insert, starting from an end that is furthest from the rotational axis of the cutting insert in the direction perpendicular to the rotational axis.

A cutting insert according to another aspect of the present disclosure is mounted on an indexable rotating tool comprising a body that rotates about a predetermined rotational axis. The above cutting insert comprises: an upper surface; a lower surface to be mounted on a seating surface of a body; and a peripheral side surface which connects the upper surface and the lower surface and regarding which a cutting edge is formed with respect to the upper surface. Further, the cutting edge comprises: an inner cutting edge; and a corner cutting edge which is connected to the inner cutting edge and which, in a plan view seen from a direction facing the upper surface, has a predetermined curvature, and is formed at a position that is further from the rotational axis than the inner cutting edge.

The cutting insert further comprises: a perpendicular part which is connected to the lower surface and which comprises, as the peripheral side surface, a perpendicular surface to the lower surface; a connecting part which is connected to the perpendicular part and which comprises, as the peripheral side surface, a surface that forms a first inclination angle with the perpendicular surface; and an inclined part which is connected to the connecting part and which comprises, as the peripheral side surface, a surface that forms a second inclination angle, being smaller than the first inclination angle, with the perpendicular surface.

An indexable rotating tool according to a further aspect of the present disclosure comprises: a body which rotates about a predetermined rotational axis and has a diameter of 15 mm or less; and a cutting insert which is mounted on each of at least two seating surfaces formed in the body.

BRIEF DESCRIPTION OF DRAWINGS

FIGS. 3A, 3B and 3C illustrate an end mill E on which two cutting inserts 10 have been mounted.

DESCRIPTION OF EMBODIMENTS

Embodiments of the present invention will hereinafter be described with reference to the drawings. The embodiments below are illustrative in order to describe the present invention and are not intended to limit the present invention to such embodiments.

[First Embodiment]

Figure 1A:
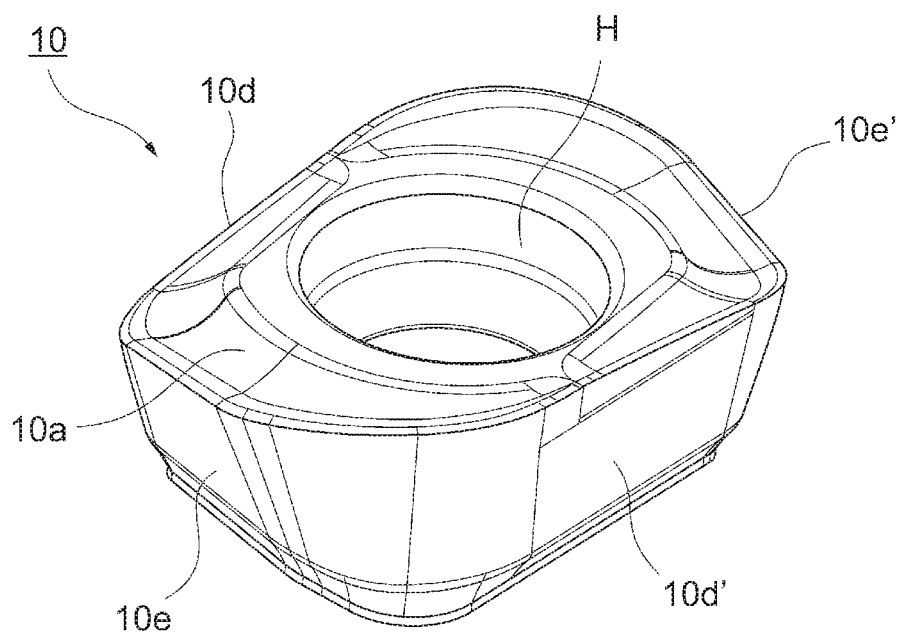
FIGS. 1A and 1B are perspective views of a cutting insert 10.
Figure 1B:
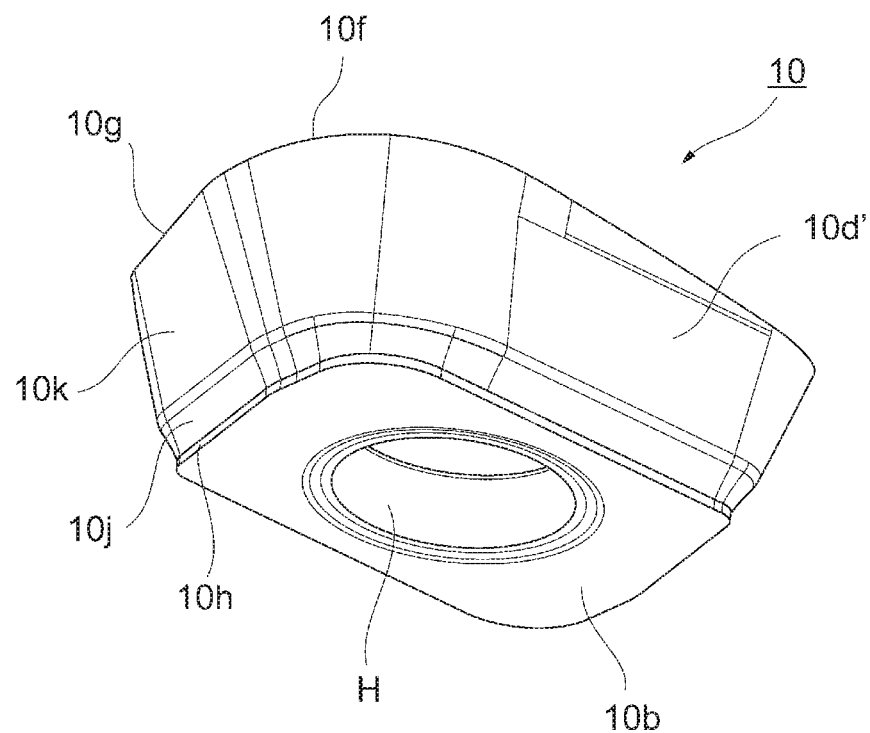
Figure 2A:
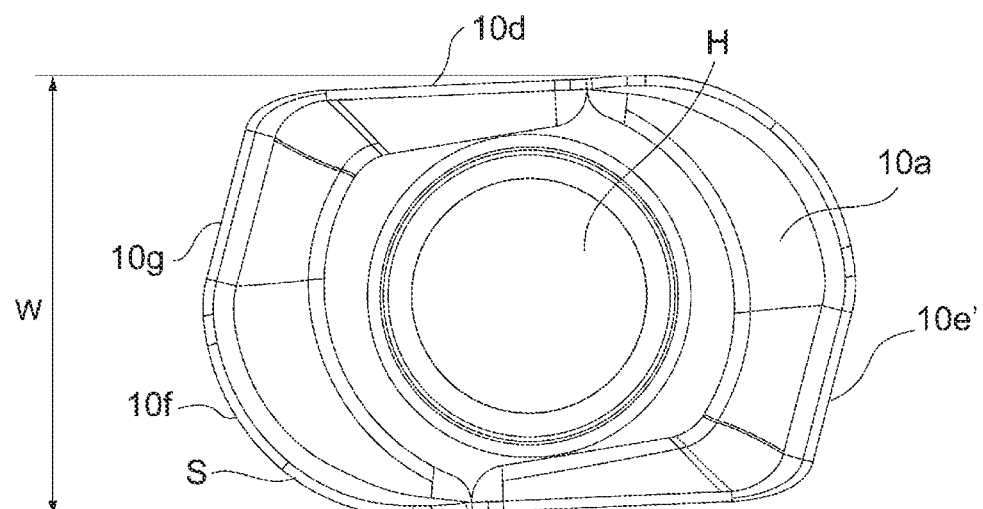
FIGS. 2A, 2B and 2C are a front view of the cutting insert 10, a left side view thereof and a bottom view thereof, respectively.
Figure 2B:
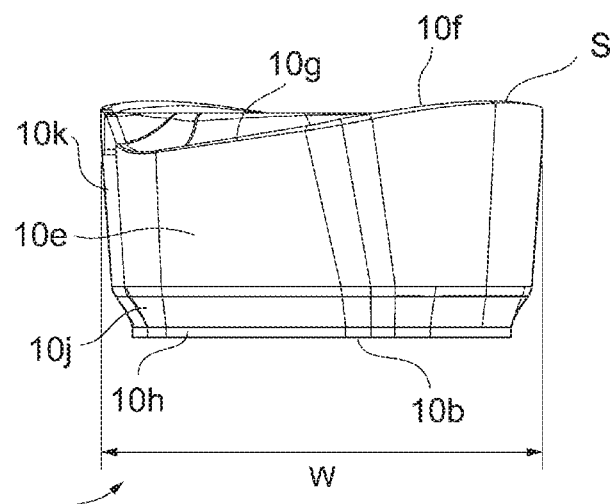
Figure 2C:
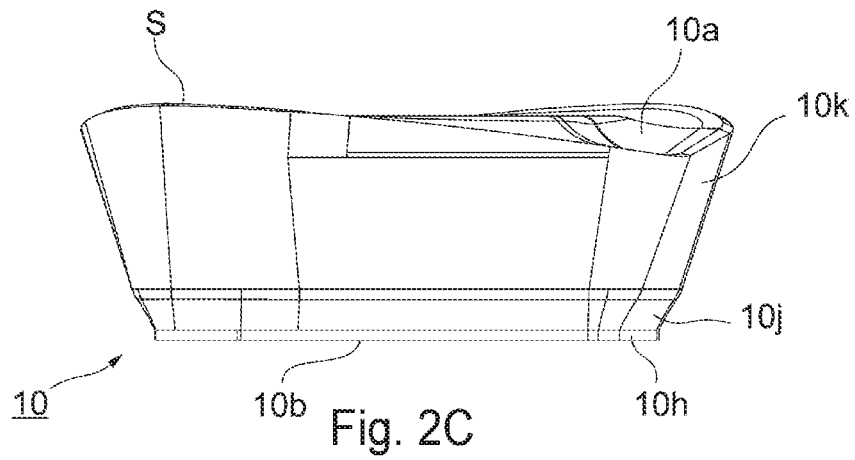

FIGS. 1A and 1B are perspective views of a cutting insert 10 according to an embodiment of the present invention. FIGS. 2A, 2B and 2C are a front view of the cutting insert 10, a left side view thereof and a bottom view thereof in relation to the front view, respectively.

As shown in the above figures, the cutting insert 10 comprises an upper surface $10a$, a lower surface $10b$ and a peripheral side surface which connects the upper surface $10a$ and the lower surface $10b$. The peripheral side surface comprises substantially flat side surface parts $10d$ (a first side surface part) and $10d'$ (a second side surface part) and front surface parts $10e$ (a first front surface part) and $10e'$ (a second front surface part), which each connect the two side surface parts.

As shown in FIG. 2A, part of a connecting part between the upper surface $10a$ and the side surface part $10d$ has a linear shape. Similarly, part of a connecting part between the upper surface 10a and the side surface part 10d' has a linear shape which is parallel to the above linear shape. As shown in FIGS. 2A and 2B, an interval between the parts respectively constituting the above linear shapes is defined as a width W of the cutting insert 10. The width W of the cutting insert 10 according to the present embodiment may be, for example, from 4 mm to 4.5 mm.

The lower surface 10b of the cutting insert 10 is comprised of a flat surface. Further, the cutting insert 10 is provided with, at a center part thereof, a through hole H which penetrates the upper surface 10a and the lower surface 10b. A clamp screw to pass through the through hole H is screwed into a female thread provided in a seating surface of a body of an indexable rotating tool, whereby the cutting insert 10 is fixed to the body. At this time, the cutting insert 10 is fixed to the body such that a part thereof close to the side surface part 10d is near a rotational axis of the body and a part thereof close to the side surface part 10d' is distant from the rotational axis of the body.

As shown in FIGS. 2B and 2C, the cutting insert 10 comprises: a perpendicular part 10h which is connected to the lower surface 10b and comprises a peripheral side surface perpendicular to the lower surface 10b; a connecting part 10j which is connected to the perpendicular part 10h and extends such that a cross-sectional area thereof increases as it heads away from the lower surface 10b; and an inclined part 10k which is connected to the connecting part 10j and extends such that a cross-sectional area thereof increases as it heads away from the lower surface 10b. As shown in the figures, a peripheral side surface of the connecting part 10j has a large inclination angle (a first inclination angle) relative to the peripheral side surface of the perpendicular part 10h, and therefore has a high rate of increase of the cross-sectional area. Meanwhile, a peripheral side surface of the inclined part 10k has a small inclination angle (a second inclination angle) relative to the peripheral side surface of the perpendicular part 10h, and therefore has a low rate of increase of the cross-sectional area.

In terms of the height in a direction perpendicular to the lower surface 10b, the height increases in the order of the perpendicular part 10h, the connecting part 10j, and the inclined part 10k. Further, the sum of the heights of the perpendicular part 10h and the connecting part 10j is greater than the height of the inclined part 10k.

In other words, the cutting insert 10 has a shape tapered from the upper surface 10a to the lower surface 10b and is structured such that: the inclined part 10k is narrowed such that a cross-sectional area thereof decreases gently from the upper surface 10a toward the lower surface 10b; the connecting part 10j is narrowed such that a cross-sectional area thereof decreases significantly toward the lower surface 10b; and the perpendicular part 10h is connected to the lower surface 10b while a cross-sectional area thereof is kept constant. It should be noted that, as FIGS. 2B and 2C show different inclination angels of the inclined part 10k, the respective inclination angles of the connecting part 10j and the inclined part 10k each do not need to be constant. However, an average value of the inclination angle of the connecting part 10j and an average value or a representative value of the inclination angle of the inclined part 10k have a magnitude relationship.

A connecting part between the upper surface 10a and the front surface part 10e is provided with a cutting edge. The cutting edge comprises a corner edge 10f and an inner cutting edge 10g.

The corner edge 10f is provided at a corner part of the cutting insert 10 and is formed so as to have a predetermined curvature when seen from a direction facing the upper surface 10a. The curvature of the corner edge 10f is selected in accordance with the specification of a corner R of a subject of machining. For instance, when the specification of the corner R is set to be 2 mm, the cutting insert 10 is used in which the corner edge 10f has a predetermined radius of curvature (for example, a little less than 2 mm), in order for the corner R to be 2 mm in length after the machining, in consideration of a rotational trajectory of the corner edge. In the present embodiment, as shown in FIG. 2A, the corner edge 10f is formed so as to be large and to have a greater curvature than that involved in a general case. When seen from the direction facing the upper surface 10a, the corner edge 10f is formed so as to reach a position corresponding to from 40% or more to 50% or less of the width W in a direction of the width W (a direction connecting the side surface part 10d and the side surface part 10d'), starting from the side surface part 10d', and the radius of curvature of the corner edge 10f constitutes, for example, 50% or less of the width W.

Further, as shown in, for example, FIGS. 2A and 2B, the inner cutting edge 10g is formed so as to be continuous with the corner edge 10f. The inner cutting edge 10g comprises: a connecting part connected to the corner edge 10f; a major inner cutting edge 10g' formed so as to be substantially linear when seen from the direction facing the upper surface 10a; and a connecting part connected to the side surface part 10d.

As shown in FIGS. 2B and 2C, a top part S, which has the maximum distance from the lower surface 10b to the cutting edge, is included in the corner edge 10f. It is desirable for the corner edge 10f to be provided such that the top part S is located in a region covering 40% or less of the corner edge 10f, and further preferably 20% or less thereof, starting from the side surface part 10d' in the direction of the width W. In the present embodiment, as shown in FIG. 2B, the top part S is located in the region covering 20% or less of the corner edge 10f, starting from the side surface part 10d' in the direction of the width W. Further, as shown in FIGS. 2B and 2C, since the top part S is provided on the corner edge 10f, the top part S can be seen in both the bottom view and the left side view.

As shown in FIG. 2B, the distance between the corner edge 10f and the lower surface 10b decreases gradually as it heads away from the top part S toward a connecting part of the corner edge 10f with respect to the inner cutting edge 10g. The distance between the inner cutting edge 10g and the lower surface 10b also continues to decrease gradually. Further, the distance between the inner cutting edge 10g and the lower surface 10b increases significantly in the connecting part of the inner cutting edge 10g with respect to the side surface part 10d.

The cutting insert 10 has an axisymmetric structure with respect to the rotational axis of the through hole H. Therefore, a connecting part between the front surface part 10e' and the upper surface 10a is provided with the same cutting edge as the cutting edge constituted by the corner edge 10f and the inner cutting edge 10g.

FIG. 3A is a perspective view of an end mill E (an indexable rotating tool) on which two cutting inserts 10 have been mounted. FIG. 3B is a view of the end mill E seen from a direction of a rotational axis AX. FIG. 3C is a view of the end mill E seen from a direction perpendicular to the rotational axis AX. The end mill E is a small-diameter end mill E having a tool diameter of from 8 mm to 20 mm, and it can be used for the machining of, for example, a mold.

As shown in the above figures, a cylindrical body B, serving as a leading end part of the end mill E, is provided with two seating surfaces F and F' for respectively mounting cutting inserts 10. The seating surfaces F and F' are respectively provided with female threads. A clamp screw CS, which penetrates the through hole H of each of the cutting inserts 10, is screwed into each of the female threads, whereby the lower surfaces 10*b* of the cutting inserts 10 are pressed toward the seating surfaces F and F', and each of the cutting inserts 10 is fixed to the body B. At this time, the front surface part 10*e* faces in the same direction as the rotational axis AX. Further, the cutting insert 10 is mounted on the body B such that the side surface part 10*d* is near the rotational axis A and the side surface part 10*d'* is distant from the rotational axis AX. Therefore, the corner edge 10*f* and the inner cutting edge 10*g* are located in the direction from the top part S, being located on the side surface part 10*d'* side, to the rotational axis AX.

Figure 4A:
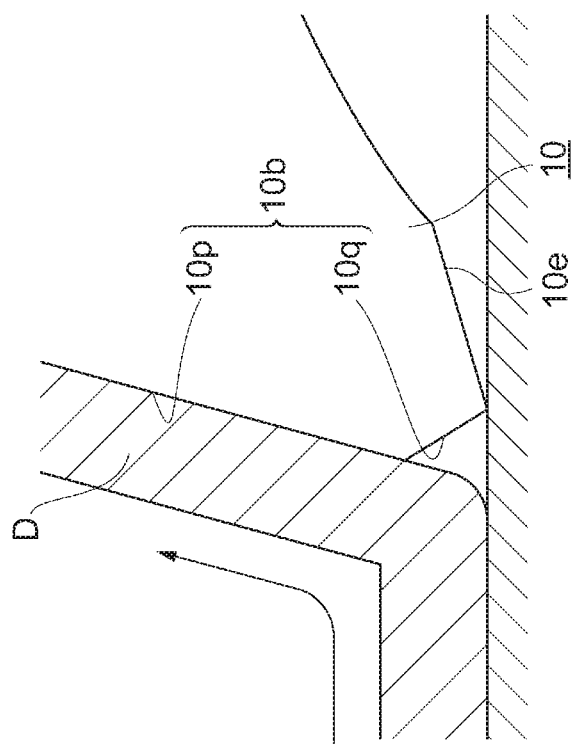
FIGS. 4A and 4B are cross-sectional views perpendicular to a cutting edge when the cutting insert 10 is mounted on a body B.
Figure 4B:
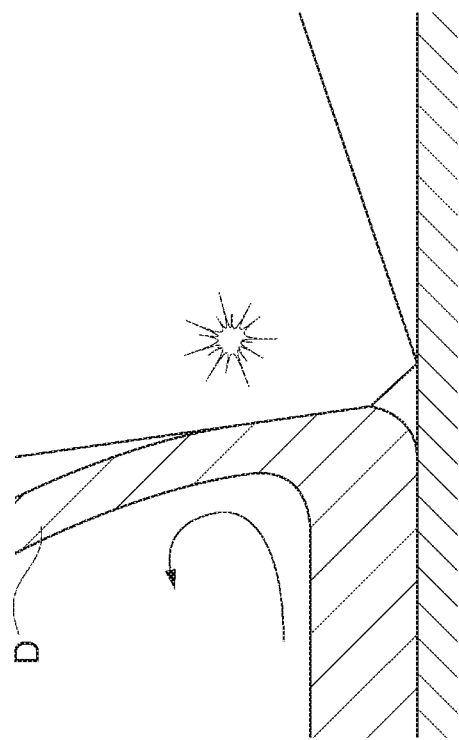

FIG. 4A is a cross-sectional view perpendicular to the cutting edge when the cutting insert 10 is mounted on the body B, and FIG. 4B is a similar cross-sectional view in a comparative example.

As shown in FIG. 4A, the upper surface 10*a* of the cutting insert 10 comprises a rake surface 10*p* and a land 10*q* connected to the rake surface 10*p* and the front surface part 10*e*. As shown in the above figure, an axial rake angle of the rake surface 10*p* is positive (such angle refers to an angle formed by two lines of intersection, i.e., a line of intersection of a $P_p$ plane (i.e. a plane defined by a direction of a principal component of force and a depth-of-cut direction) and a reference plane and a line of intersection of the $P_p$ plane and a rake surface; and such angle may also be referred to as an axial rake); namely, the rake surface 10*p* is inclined backward so as to extend backward in a rotating direction as it heads away from the corner edge 10*f* (and the inner cutting edge 10*g*). Meanwhile, an axial rake of the land 10*q* is negative; namely, the land 10*q* is inclined forward in the rotating direction as it heads away from the corner edge 10*f* (and the inner cutting edge 10*g*). It should be noted that a clearance angle of the front surface part 10*e*, which functions as a flank, is set at 17°, meaning a relatively large angle, and this can suppress flank wear. A positive axial rake is kept throughout the corner edge 10*f*. However, the corner edge 10*f* is provided such that it has a smaller axial rake as it heads toward the inner cutting edge 10*g*.

As shown in FIG. 4B, in the case of a cutting insert I in a comparative example, both a land thereof and a rake surface thereof have negative axial rakes.

Figure 5A:
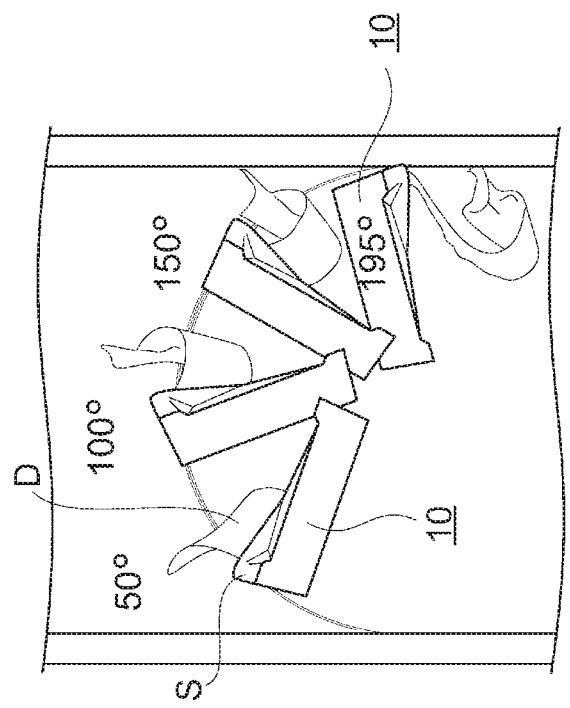
FIGS. 5A to 5D show simulation results of machining with the use of the cutting insert 10.
Figure 5B:
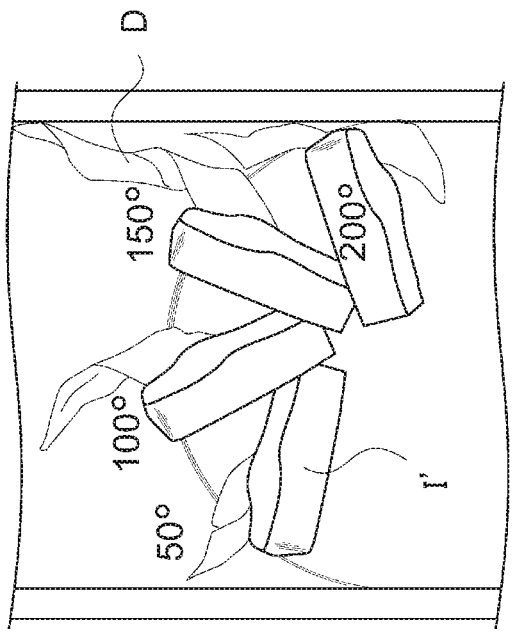

FIGS. 5A and 5B show the results of simulation when a bottom surface of a work is machined while the corner R is formed, using the cutting insert 10 according to the present embodiment, and such simulation is seen from a direction facing the front surface part 10*e'*. However, in the case of FIG. 5A, the cutting insert 10 is mounted on the body B so as to involve a smaller radial rake angle than that involved in the case of FIG. 5B (such angle refers to an angle formed by two lines of intersection, i.e., a line of intersection of a $P_f$ plane (i.e. a plane defined by a direction of a principal component of force and a tool feed direction) and a reference plane and a line of intersection of the $P_f$ plane and a rake surface; and such angle may also be referred to as a radial rake).

FIGS. 5A to 5D show the results of simulation when a work is machined using cutting inserts I and I' according to the comparative example.

In the case of FIG. 5A, the top part S is located so as to be close to the side surface part 10*d'* of the cutting insert 10. Thus, the work can be machined while a radial rake, which heads away from the top part S toward the inner cutting edge 10*g*, has a small negative value. Therefore, it is possible to appropriately curl a chip D which grows along with rotation of the end mill E around the rotational axis AX. Further, since the axial rake is positive in FIG. 4A, the chip D is not hindered from moving in a direction of a base part of the body B (an upward direction relative to the plane of the page), compared with the case of FIG. 4B, where the axial rake is negative, thereby leading to an improvement in control of the chip D.

Figure 5C:
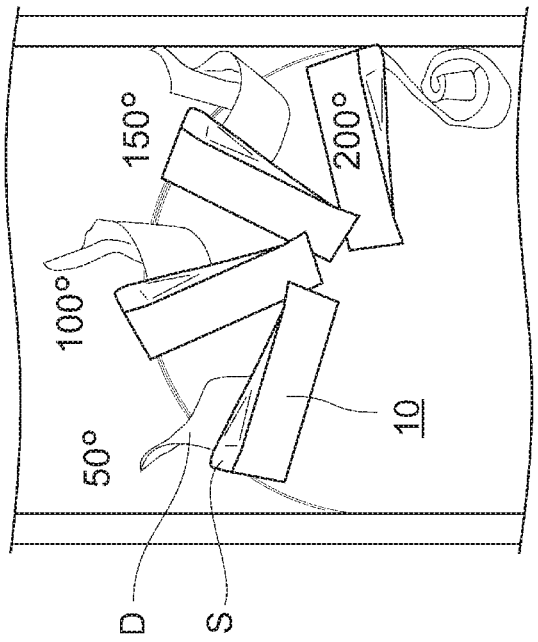
Figure 5D:
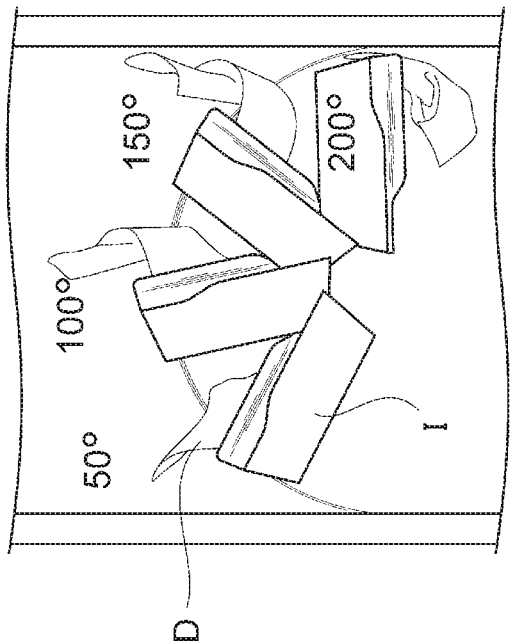

Meanwhile, in the cases of FIGS. 5C and 5D, the top part S is located near the center of each of the cutting inserts I and I'. Thus, the work is machined while the radial rake has a large negative value. Further, since the axial rake is negative, a force acts which presses the chip D in a direction of a machined surface. Therefore, the chip D is not hindered from being discharged, thereby leading to the chip D being likely to move in a radially outward direction.

The above may result in the case where the chip D which grows along with the rotation extends in the radially outward direction and, at the end of chipping (around 200°), the chip D is jammed with respect to a wall surface of the work.

In the case of FIG. 5B as well, the top part S is located so as to be close to the side surface part 10*d'* of the cutting insert 10. Thus, the work can be machined while a radial rake, which heads away from the top part S toward the inner cutting edge 10*g*, has a smaller negative value than that involved in each of the cases of FIGS. 5C and 5D. Therefore, it is possible to appropriately curl a chip D which grows along with rotation of the end mill E around the rotational axis AX. Further, since the axial rake is positive in FIG. 4A, the chip D is not hindered from moving in the direction of the base part of the body B, compared with the case where the axial rake is negative, thereby leading to an improvement in control of the chip D.

The cutting insert 10 according to the present embodiment contributes to an improvement in the rigidity of the body B. The width W of the cutting insert 10 according to the present embodiment is from 4 mm to 4.5 mm, meaning that such cutting insert 10 is very thin, and thus, the body B on which such cutting insert 10 is mounted also has a narrow width. Therefore, when the body B is reduced in size, the rigidity of the body B is significantly impaired.

Meanwhile, when mounting a cutting insert on a body, in order to reliably bring a side surface of the cutting insert into contact with a wall surface of an insert seat of the body, a corner part which connects a seating surface of the insert seat and the wall surface thereof is hollowed out so as to form a recess.

The inventors of the present application have focused on the point that the hollowing out of a corner part of an insert seat for the purpose of forming a recess has an influence on the rigidity of a body.

The cutting insert 10 according to the present embodiment is provided with the inclined part 10*k* and the connecting part 10*j*, and thus, in such cutting insert 10, the edge of the lower surface 10*b* is located close to the center of the lower surface 10*b* compared with a general cutting insert. Therefore, as shown in FIG. 3B, small recesses can be formed at corner parts C and C' of the insert seats of the body B on which the cutting inserts 10 are mounted. Accordingly, the rigidity of the body B can be increased.

Further, since the width W of the cutting insert 10 is from 4 mm to 4.5 mm, meaning a very narrow width, the contact area of the cutting insert 10 with respect to the seating surface F or F' of the insert seat is limited. If the contact area is too small, it does not allow the cutting insert to be mounted on the body B in a stable manner.

The cutting insert 10 is provided with the perpendicular part 10h, which is continuous with the inclined part 10k and the connecting part 10j, and this can result in the lower surface 10b having a larger area than that involved in the case of a cutting insert 10 not being provided with the perpendicular part 10h. Therefore, it is possible to keep the contact area of the cutting insert 10 with respect to the seating surface F or F' of the insert seat.

Further, since the peripheral side surface of the inclined part 10k, which has a relatively small inclination angle, can be brought into contact with the wall surface of the insert seat, the cutting insert 10 can be supported in a more stable manner than that involved in the case where a peripheral side surface having a large inclination angle is brought into contact with the wall surface of the insert seat.

Accordingly, the cutting insert 10 according to the present embodiment can achieve both an increase in the rigidity of the body B and the stable mounting of the cutting insert 10.

Since a positive axial rake can be achieved when mounting the cutting insert 10 on the body B, the chip D is not hindered from extending in the direction of the base part of the body B. This leads to an improvement in control of the chip D.

There have been cases in which a large axial rake may lead to damage to the cutting edge. Therefore, the axial rake of the corner edge 10f is made gradually smaller while being kept positive, as it heads toward the inner cutting edge 10g. This can suppress damage to the corner edge 10f.

The strength of the cutting edge can be improved due to the provision of the land 10q. However, a cutting insert may be configured so as not to be provided with the land 10q, depending on the subject of machining, and examples of such cutting insert include a cutting insert for aluminum machining.

Since the top part S is positioned at the end of the cutting edge which is furthest from the rotational axis AX, a negative radial rake can be achieved whose absolute value is smaller than that involved in any case other than that described above.

Ramping can be performed due to the provision of the inner cutting edge 10g.

The cutting insert 10 indicated in the present embodiment is intended for the end mill E; however, such cutting insert 10 is also applicable to a wide variety of cutting inserts including a cutting insert for milling.

Various modifications may be made to the present invention without departing from the gist of the invention. For example, some components in an embodiment may be incorporated into another embodiment within the extent of the ordinary creativity of a person skilled in the art.

REFERENCE SIGNS LIST

10: Cutting insert; 10a: Upper surface; 10b: Lower surface; 10d: Side surface part; 10e: Front surface part; 10f: Corner edge; 10g: Inner cutting edge; 10h: Perpendicular part; 10j: Connecting part; 10k: Inclined part; 10p: Rake surface; 10q: Land; AX: Rotational axis; B: Body; C: Corner part; E: End mill; F: Seating surface; H: Through hole; S: Top part; W: Width

What is claimed is:

1. A cutting insert which is mounted on a rotating tool comprising a body that rotates about a predetermined rotational axis, the cutting insert comprising:
   an upper surface; a lower surface to be mounted on a seating surface of the body; and a peripheral side surface which connects the upper surface and the lower surface, and a cutting edge is formed with respect to the upper surface,
   wherein the cutting edge comprises:
   an inner cutting edge; and
   a corner cutting edge which is connected to the inner cutting edge and which, in a plan view seen from a direction facing the upper surface, has a predetermined curvature, has a width corresponding to from 40% or more to 50% or less of a width of the cutting insert in a direction perpendicular to the rotational axis, and is formed at a position that is further from the rotational axis than the inner cutting edge,
   wherein a part on the corner cutting edge at a maximum distance from the lower surface, and in the plan view seen from the direction facing the upper surface, is formed in a region covering 20% or less of the width of the cutting insert, the region starting from an end that is furthest from the rotational axis of the cutting insert in the direction perpendicular to the rotational axis, and
   wherein the cutting insert comprises:
   a perpendicular part, which is connected to the lower surface, and comprises a perpendicular surface that is perpendicular to the lower surface and part of the peripheral side surface;
   a connecting part, which is connected to the perpendicular part, and comprises a first surface, the first surface forms a first inclination angle with the perpendicular surface and is part of the peripheral side surface; and
   an inclined part, which is connected to the connecting part, and comprises a second surface, the second surface forms a second inclination angle, smaller than the first inclination angle, with the perpendicular surface and is part of the peripheral side surface.

2. The cutting insert according to claim 1, wherein the width of the cutting insert is 5 mm or less.

3. The cutting insert according to claim 1, wherein the corner cutting edge is provided such that a distance thereof from the lower surface decreases gradually in a direction away from the top part toward a connecting part where the corner cutting edge connects to the inner cutting edge.

4. The cutting insert according to claim 3, wherein the inner cutting edge is shaped such that a distance between the inner cutting edge and the lower surface is gradually reduced in a direction away from the connecting part where the inner cutting edge connects to the corner cutting edge.

5. The cutting insert according to claim 1, wherein:
   the cutting insert is provided with a through hole for allowing a screw for mounting the cutting insert on the body to pass through the through hole; and
   a second cutting edge is provided in symmetry with the cutting edge about a rotational axis of the through hole.

6. A rotating tool comprising:
   a body which rotates about a predetermined rotational axis and has a diameter of 15 mm or less; and
   the cutting insert according to claim 1 which is mounted on each of at least two seating surfaces formed in the body.

7. The rotating tool according to claim 6, wherein the upper surface of the cutting insert comprises:
  a rake surface which has a positive axial rake; and
  a land including a portion which connects the rake surface and the corner cutting edge, and the portion of the land has a negative axial rake in a direction away from the corner cutting edge.

8. The rotating tool according to claim 7, wherein the positive axial rake of the rake surface of the cutting insert becomes smaller as it heads away from the top part toward a connecting part of the corner cutting edge with respect to the inner cutting edge.

9. A cutting insert which is mounted on a rotating tool comprising a body that rotates about a predetermined rotational axis, the cutting insert comprising:
  an upper surface; a lower surface to be mounted on a seating surface of the body; and a peripheral side surface which connects the upper surface and the lower surface, and a cutting edge is formed with respect to the upper surface,
  wherein the cutting edge comprises:
    an inner cutting edge; and
    a corner cutting edge which is connected to the inner cutting edge and which, in a plan view seen from a direction facing the upper surface, has a predetermined curvature, has a width corresponding to from 40% or more to 50% or less of a width of the cutting insert in a direction perpendicular to the rotational axis, and is formed at a position that is further from the rotational axis than the inner cutting edge,
  wherein the width of the cutting insert is from 4 mm or more to 4.5 mm or less,
  wherein a part on the corner cutting edge at a maximum distance from the lower surface, and in the plan view seen from the direction facing the upper surface, is formed in a region covering 20% or less of the width of the cutting insert, the region starting from an end of the cutting insert in the direction perpendicular to the rotational axis, and
  wherein the cutting insert comprises:
    a perpendicular part, which is connected to the lower surface, and comprises a perpendicular surface that is perpendicular to the lower surface and part of the peripheral side surface;
    a first inclined part, which is connected to the perpendicular part and comprises a first surface, the first surface forms a first inclination angle with the perpendicular surface and is part of the peripheral side surface; and
    a second inclined part which is connected to the first inclined part and comprises a second surface, the second surface forms a second inclination angle, being smaller than the first inclination angle, with the perpendicular surface and is part of the peripheral side surface.

* * * * *